Nov. 29, 1949
E. J. BROUSSOUSE
2,489,365
MAGNETIC ROTORIC BRAKE SYSTEM
FOR ELECTRIC INDUCTION MOTORS
Filed May 20, 1946
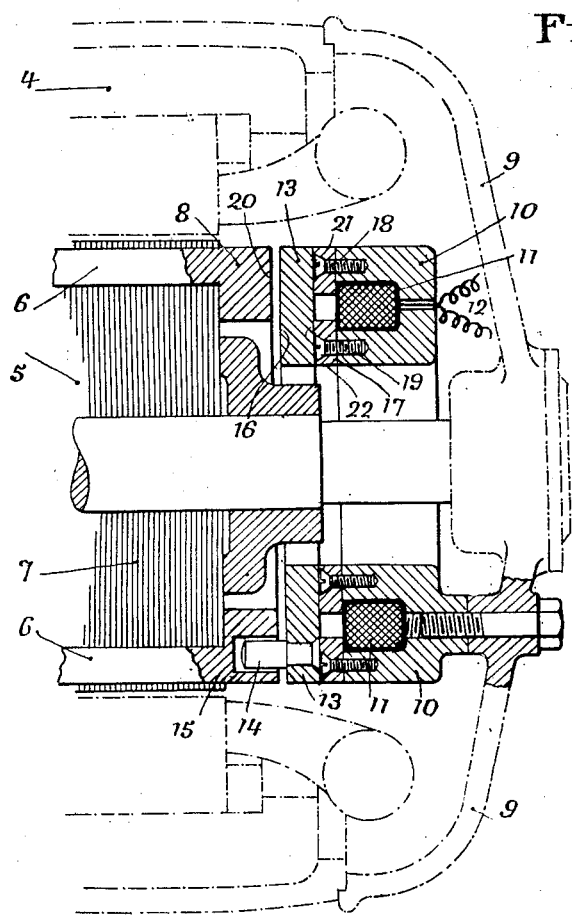
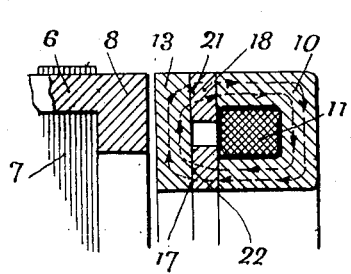
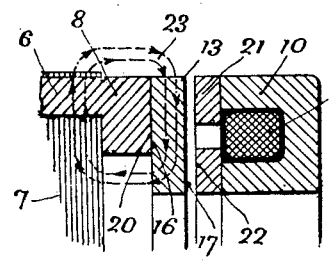
Inventor
EDOUARD JEAN BROUSSOUSE
By Haseltine, Lake & Co.
Attorneys Patented Nov. 29, 1949

2,489,365

UNITED STATES PATENT OFFICE 2,489,365

MAGNETIC ROTORIC BRAKE SYSTEM FOR ELECTRIC INDUCTION MOTORS

Edouard Jean Broussouse, Angouleme, France

Application May 20, 1946, Serial No. 670,895
In France September 17, 1945

2 Claims. (Cl. 172—120)

This invention relates to a magnetic rotoric brake system for electric induction motors comprising a brake with a fixed magnetic ring and an armature plate rendered fast with the rotating parts of the motor by a driving assembly with an axially sliding movement.

Such braking devices which have already been proposed generally offer the following disadvantages:

When the braking ceases and on starting the motor, the axially sliding movement which is necessary for releasing the armature plate from the brake ring is generally effected by means of a resilient member such as an antagonistic spring. Furthermore said spring must be strong enough for also insuring the stability of the armature plate during the operation of the motor, i. e. for avoiding a rattling capable of causing detrimental interfering frictions and possibly a prejudicial wear and tear. It is thus necessary to increase the attractive force, which determines the braking, of the antagonistic thrust of said spring.

On the other hand, the axial thrust of a spring or any other resilient member against a plate rarely operates in a well distributed manner on the periphery of the plate and this often results in jammings in the sliding joint.

Finally, owing to the presence of the resilient antagonistic member in brakes of this kind the sliding joint is located in a place adjacent to the ends of the motor shaft, which causes a certain friction caused by the tangential stress occurring at the place of said sliding joint at the moment when the brake is applied.

It is also well known to apply the brake by a resilient member such as a spring, and to release the same under the influence of the rotoric field. But in such case, the rotor is braked while stopped, and hence such devices are objectionable for certain uses, such as for motors of machine-tools.

The braking system according to the invention which obviates said drawbacks is characterized by a mechanical arrangement of the armature plate according to which a part of said plate which is magnetically permeable is placed in one of the circular magnetic fields provided at each end of the rotor by the rotoric currents which pass through the leads for the connection of the active bars or bundles and so that the action of said field insures, during the normal operation of the motor, both the releasing of the contact of the armature plate from the brake ring and a good stability of said plate during the rotation.

Furthermore, the driving member for the actuation of the sliding armature plate by the rotor will be established with advantage towards the periphery of the rotor in order to reduce as much as possible the friction caused when the brake is applied.

A form of execution of the device using the system according to the invention is shown by way of example in the appended drawing, in which:

Fig. 1 is a sectional view through a whole arrangement by which the invention is applied, for example, to one end of the rotor of a so called short-circuit or squirrel-cage motor.

Fig. 2 is a sectional view through a part of Fig. 1 in which the armature-plate is especially shown in the motor braking position, and Fig. 3 is a sectional view showing the same part of Fig. 1 in which the armature-plate is especially shown in the position for the normal operation of the motor.

In the drawing:

The short-circuit motor 4 has a rotor 5 which comprises a squirrel-cage with active bars such as 6 passing through the laminations 7 and connected at their ends by two end rings such as 8. The end bell 9 of the motor 4 supports a magnetic ring 10 containing an energizing coil 11 supplied with current by the leads 12 in any suitable manner. The outer diameter of said ring 10 can correspond, for example, to that of the conductor ring 8 forming the end of said cage. Furthermore, the ring 10 can comprise two circles or pole pieces 18, 19 connected therewith by a rigid anchorage, not shown.

A magnetically permeable armature-plate 13 having two planed faces 16—17 is connected with the rotor 5 by a series of spindles such as 14 penetrating into the ring 8 through suitable holes 15 which allow a certain sliding movement along the axis of the motor of said plate 13 which, owing to this fact, can come to bear alternately upon the planed faces 20 or 21—22 pertaining to the cage ring 8 and to the poles 18, 19 of ring 10 respectively.

The well known operation of the magnetic brake is effected as shown in Fig. 2 in which the field of lines of force is to be seen which is closed by the plate 13 and determines the adherence of the faces 21—22 with face 17.

When the braking ceases through an interruption of the current in the coil 11 and when the motor is started the ring 8 becomes the seat, by sectors, of alternating currents the direction of which changes with the rotoric periodicity but which, nevertheless, provide a circular alternating magnetic field 23 (Fig. 3) formed of juxtaposed elements and of which the ring 8 is annularly the centre.

Referring more particularly to Fig. 3 one can see that the lines of force 23 have for their effect, through their action upon the plate 13, first to release the latter at the contact place of the face 17 with faces 21—22 by bringing it through a sliding movement towards the ring 8 and then to insure its stability during the operation by maintaining the contact between the faces 16 and 20.

This double result is obtained with a great simplicity without the use of any antagonistic springs which reduce the effectiveness of the brake or of any auxiliary member, controlled or not controlled. Furthermore, the construction is very compact and requires particularly little space.

It has been shown in Fig. 1 that the pins 14 rest in driving relation in holes 15 provided in the ring 8. If necessary, said connection can be strengthened by causing the pins to enter the rotor body wholly or partly with any suitable diameter but preferably with as large a diameter as possible. Moreover, the sliding coupling by pins can be substituted by any equivalent arrangement.

The above described arrangement is applicable more particularly to short-circuit motors. It can be used for motors with a coiled armature and outer coupling with any suitable modifications.

What I claim is:

1. In an electric motor having a shaft and a rotor keyed on the shaft, a braking device comprising magnetic means fixedly positioned adjacent one end of the rotor, a plate intermediate the magnetic means and the rotor, means coupling the plate to the shaft whereby the plate is rotatable with but freely shiftable axially of the shaft, means comprising a friction surface fixed to the magnetic means in cooperating relationship with the plate, and magnetically permeable elements fixed to the plate and located within the rotoric field developed by the rotor, whereby the plate is retracted from braking position by energization of the rotor and is thereby prevented from rattling during non-braking operation of the motor.

2. In an electric motor having a shaft and a rotor keyed to the shaft and including an end ring concentric with the shaft and having a plane annular face remote from the rotor, a braking device comprising magnetic means fixedly positioned adjacent but spaced from said end ring, a plate intermediate the magnetic means and the end ring and slidably mounted on the ring, fixed means comprising a friction surface in cooperating relationship with the plate and located on the same side thereof as the magnetic means, the plate having plane surfaces adapted to cooperate selectively with said end ring face and said friction surface, at least part of the plate being of magnetically permeable material whereby energization of the motor causes the plate to be attracted to the rotor, and means to energize the magnetic means thereby to attract the plate into cooperation with the friction surface for producing a braking torque on the rotor.

EDOUARD JEAN BROUSSOUSE.

REFERENCES CITED

The following references are of record in the file of this patent:

UNITED STATES PATENTS

| Number | Name | Date |
|---|---|---|
| 832,713 | Wiard | Oct. 9, 1906 |
| 1,508,100 | Hawley | Sept. 9, 1924 |

FOREIGN PATENTS

| Number | Country | Date |
|---|---|---|
| 214,981 | Switzerland | Aug. 16, 1941 |